Aug. 13, 1957   J. BIRCHILL ET AL   2,802,630
WING LEADING EDGE DEVICE
Filed March 26, 1956   2 Sheets-Sheet 1
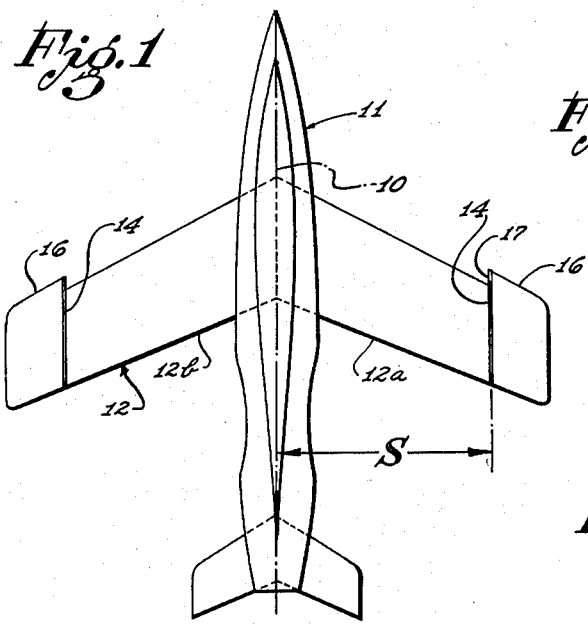
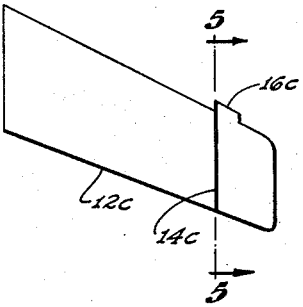
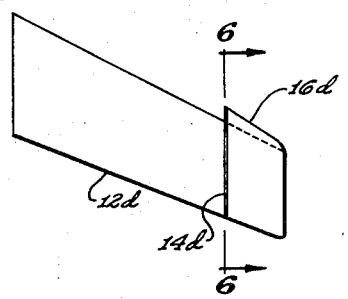
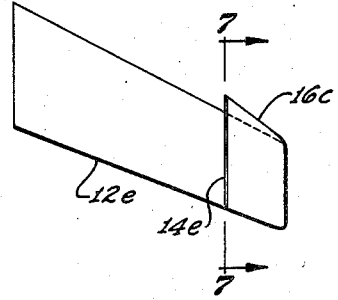
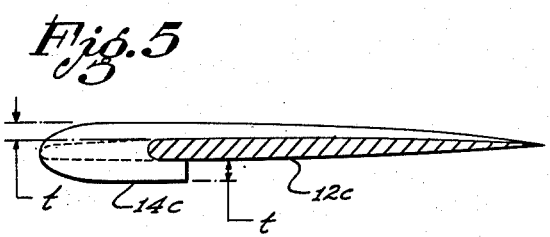
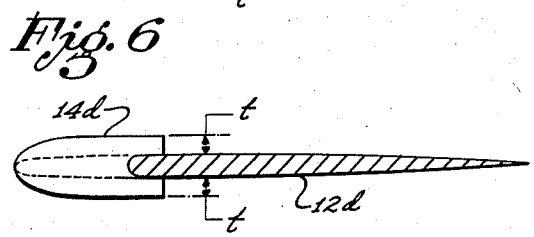
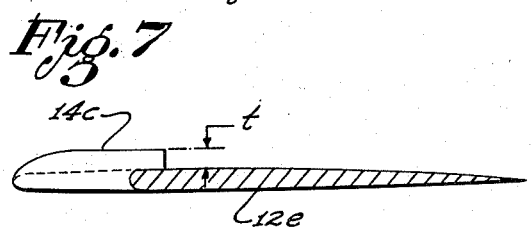
INVENTORS:
Joseph Birchill
James Selna
Their Patent Attorney

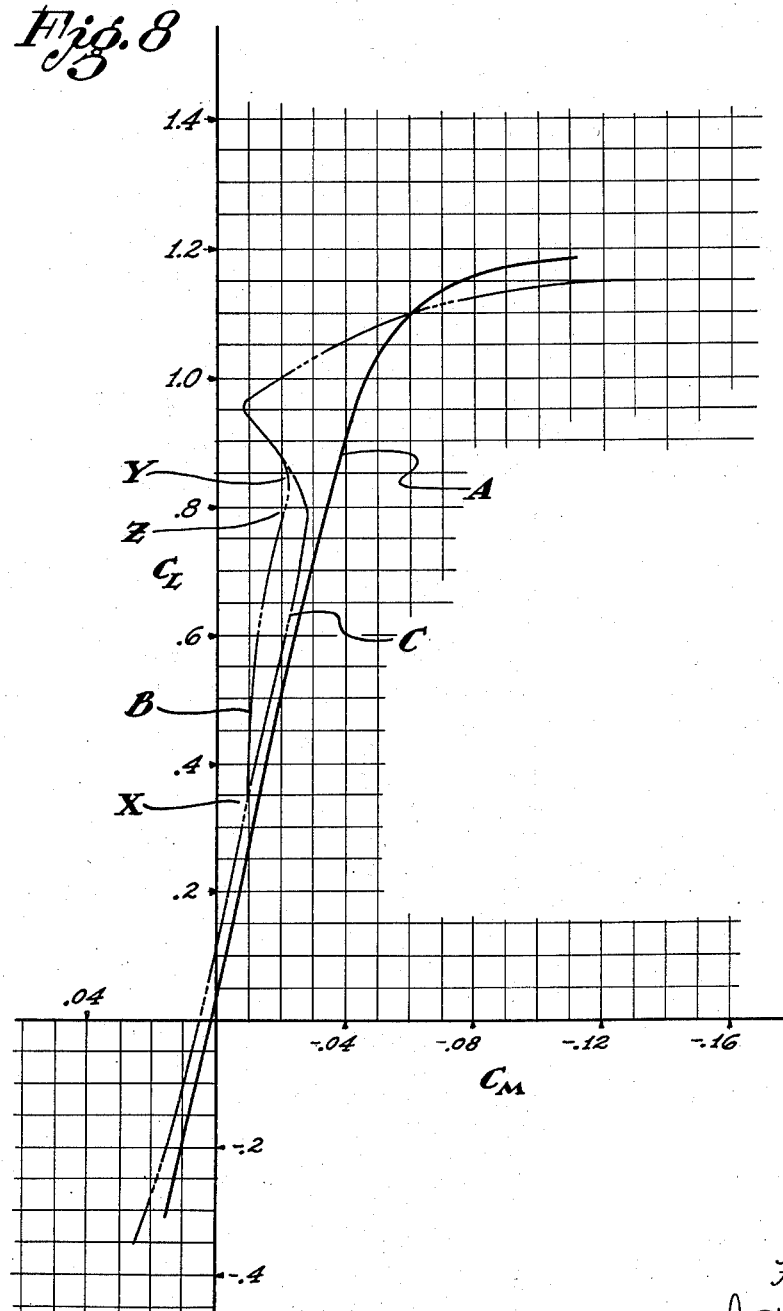

United States Patent Office 2,802,630
Patented Aug. 13, 1957

2,802,630

WING LEADING EDGE DEVICE

Joseph Birchill, Inglewood, and James Selna, Encino, Calif., assignors to Northrop Aircraft, Inc., Hawthorne, Calif., a corporation of California Application March 26, 1956, Serial No. 573,755

7 Claims. (Cl. 244—91)

This invention relates to aircraft structures and more particularly to the construction of sweptback wings and like structures incorporating means improving their pitching movement characteristics.

In present day aircraft it has been possible to overcome many prevailing aerodynamic problems encountered at high speeds by employing sweptback wings having thin airfoil sections. However, as is well known in the art, wings of this character generally exhibit undesirable characteristics rendering them unstable at low speeds, for example at speeds encountered during landing and take-off operations.

The aforementioned undesirable characteristics of sweptback wings constitutes a "pitching-up" tendency due to leading edge vortex flow and consequent separation of flow over the outboard portion of the wing. Undesirable flow characteristics of this type are well known and further explanation in this connection is not deemed necessary. Various modifications in the basic construction of sweptback wing structures have been employed to alleviate these conditions, however, to the best of our knowledge these modifications have not proven entirely satisfactory and leave much to be desired in this respect.

In disclosing the present invention an aircraft having sweptback wings is illustrated, however, it should be understood that the present invention may be practiced in connection with any sweptback airfoil structure, Accordingly the terms "airfoil" and "airfoil structure" as used herein not only embrace sweptback wing structures but any type of sweptback airfoil structure.

An object of this invention is to provide an airfoil structure having a modified leading edge functioning to maintain the center of pressure acting thereon at substantially the same position at such times as the structure is subjected to either high or low lift coefficients.

Another object is to provide an airfoil structure having a modified leading edge which does not materially increase the aerodynamic drag on the structure.

Another object is to provide an airfoil structure having a modified leading edge the components of which require no adjustments or manipulations during the operation thereof, which are light in weight, and simple in design and construction.

The characteristic features of the present invention are pointed out in the appended claims, however, the invention itself and a preferred mode for carrying it out will be better understood by referring to the following description taken in connection with the accompanying drawings forming a part of this application and in which:

Figure 1 is a plan view of an airplane the wings of which have been modified as disclosed herein.

Figures 2, 3, and 4 are plan views illustrating various modifications which may be applied to the wings of the airplane shown in Figure 1.

Figures 5, 6 and 7 are cross-sectional views taken along the lines 5—5, 6—6, and 7—7 of Figures 2, 3, and 4, respectively.

Figure 8 is a graph illustrating the pitching movements of various sweptback wings.

As stated above conventional sweptback airfoil structures are longitudinally unstable at low speeds when subjected to moderate and high lift coefficients. These unstable conditions are graphically illustrated in Figure 8 in which three typical pitching moment curves A, B, and C are shown. The pitching moment curves A, B, and C are representative of a modified, an unmodified and a partially modified sweptback wing structure, respectively. In the curves shown in Figure 8 lift coefficients ($C_L$) are plotted against moment coefficients ($C_M$) and illustrate conditions prevailing at speeds of approximately Mach .60. The moment coefficients are representative of pitching moments considered with respect to the 30% mean aerodynamic chord of a sweptback wing structure, this location being typical of the aft center of gravity location for an airplane of the type illustrated in Figure 1.

A comparison of the curves of Figure 8 clearly illustrate the characteristics desired in a sweptback wing under the prevailing conditions illustrated therein. Curve B, which is typical of an unmodified wing, displays distinct unstable characteristics at two locations. These locations, indicated by the reference characters X and Y, are apparent by unstable breaks or "pitch-ups" which interrupt the continuity of the curve B. Curve C is typical of a partially modified sweptback wing, that is one that has been modified by currently known techniques. It will be noted that the latter type of modification renders a wing more stable than a conventional wing as represented by curve B. The unstable portion of curve B, located between the points X and Y has been eliminated from curve C by the partial modification, however, the unstable portion occurring at point Y still remains. Curve C coincides with unstable curve B throughout its extent beyond the points X and Y. In contrast curve A, which is typical of a sweptback wing modified by the addition of a combined fence and chord extension as disclosed herein, displays exceptional stable characteristics throughout its extent. The unstable breaks, occurring in curves B and C, are not present in curve A. The slope of this latter curve is constant and approaches approximately a straight line for lift coefficients ranging from —0.3 to approximately the maximum lift thereof at which time the curve levels off in a conventional manner.

From the above discussion it will be apparent that sweptback wing structures having the stable characteristics illustrated by curve A are desirable. Sweptback wings having these desirable characteristics may be provided by incorporating therein leading edge extensions and fences in combination, substantially as shown in Figures 1–7, inclusive. To date, an official explanation as to why sweptback wing structures so constructed display these characteristics, is not available, however, it is apparently due to a more perfect airflow over the outboard portion of a wing than has hitherto been achieved.

Referring to Figure 1 an airplane 11 having a cantilever type single sweptback wing assembly 12 is shown. The wing assembly may be considered as consisting of right and left hand wing structures 12a and 12b, respectively, which are secured together along a common vertical abutting surface 10 coinciding in part with the longitudinal axis of symmetry of the airplane. Each of the wing structures 12a and 12b is provided with a fence 14 in combination with a leading edge chord extension 16.

Relationships of the wing assembly 12, fences 14, and extensions 16, which are typical of the modifications shown in Figures 2–7, inclusive, are as follows. The inboard end surfaces 17 of each extension and the inboard surface of each respective fence are in flush relationship to provide a plane common surface which is in parallel relationship with the aforementioned abutting surface 10, or in other words the surface 17 and side surfaces of the fences 14 extend chordwise. The surface 17 is located a predetermined distance outboard of the longitudinal centerline of the plane 11. Although the location of the inboard ends of the extensions 16 may vary considerably their best and most practical position has been found to be seventy percent (70%) of the wing's semi-span. The extent of the overhang of the extension 16, at the inboard end of the extension, may equal about twenty percent (20%) of the wing's chord length at this point, however, this overhang may also vary through a considerable range. The leading edge of the fence 14 faires into the extreme leading edge of the extension 16. The fence projects in a normal direction, indicated in Figures 5–6 by the reference character $t$, with respect to the upper and lower surfaces of the wing assembly and reaches a maximum distance above and/or below the outer wing surfaces just aft of the location at which the overhang of the extension 16 faires into the wing proper.

In the specific embodiment shown in Figures 2 and 5 the leading edge of the extension's overhang is substantially parallel to the leading edge of the wing proper and terminates at approximately eighty percent (80%) of the wing's semi-span. The fence 14c constitutes an elongated narrow member having parallel side surfaces and in profile resembles the letter J. The U-shaped portion of the fence embraces the overhang of the extension 16c with the long side extending chordwise over the top of the wing and fairing into the latter adjacent the trailing edge thereof. The under portion of the fence 16c terminates chordwise at approximately the position at which the inboard end of the overhang fairies into the wing proper.

The modification shown in Figures 3 and 6 is similar to the modification illustrated in Figures 2 and 5. However, in this modification the overhang of the extension 16d extends to the outboard end of the wing. Both the upper and lower portions of the fence 14d terminate at the same chordwise location as the lower portion of the fence illustrated in Figure 5. Otherwise the relationship described in connection with fence 14c and extension 16c are identical and further explanation is not believed necessary.

In the modification shown in Figures 4 and 7 the leading edge of the overhang has a pronounced tapering relationship with respect to the leading edge of the wing proper. Also in this embodiment the fence 14e is located only on the upper side of the wing structure 12e. Otherwise the relationships shown in this embodiment are the same as those shown in Figures 2, 3, 5 and 6.

The modified wings shown in Figures 1 to 7, inclusive, display the desirable stable characteristics as discussed in connection with the pitching moment curves of Figure 8. Further the combined fences and leading edge chord extensions add very little drag to wings when subjected to low lift coefficients and result in a reduction in drag when subjected to moderate and high lift coefficients.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An airfoil, comprising: a structure having inner and outer ends and a leading edge extending between said ends; said structure being streamlined in cross-section; at least a portion of said leading edge adjacent said outer end overhanging the remainder of said leading edge to provide an extension thereof; and a fence mounted on said structure adjacent the end of said extension which is nearest said inner end.

2. A sweptback airfoil, comprising: a structure which is streamlined in cross-section; said structure having upper and lower surfaces, inner and outer end surfaces; and a forward portion defining a leading edge extending between said end surfaces; said inner end surface being located generally ahead of said outer end surface when said structure is viewed from above; at least a portion of said leading edge adjacent said outer end overhanging the remainder of said leading edge to provide an extension thereof; and a fence mounted on said structure adjacent the end of said extension which is nearest said inner end surface.

3. A sweptback airfoil as set forth in claim 2: in which said inner end terminates in a plane surface and said fence constitutes a narrow member having parallel side surfaces, the end surface of said extension, most adjacent said inner end surface, and the side surfaces of said fence being in parallel relationship with respect to each other and said inner end surface.

4. A sweptback airfoil as set forth in claim 3: in which the end surface of said extension and the side surface of said fence located most adjacent to said inner end surface lies in a common plane.

5. In an aircraft, a wing mounted on said aircraft and having a leading edge which is sweptback, at least a portion of said leading edge overhanging the remainder of said leading edge in a forwardly direction to provide a leading edge chord extension, and a fence mounted on said wing adjacent the inboard end of said extension.

6. Apparatus as set forth in claim 5: further characterized in that said fence constitutes a narrow elongated member having parallel side surfaces, the inboard end of said extension terminating in a plane surface, and the side surfaces of said fence and the inboard end of said extension extending chordwise of said wing.

7. Apparatus as set forth in claim 6: further characterized in that the inboard end of said extension and the inboard side surface of said fence lies in a common plane.

No references cited.